United States Patent [19]

Lee et al.

[11] Patent Number: 5,589,923
[45] Date of Patent: Dec. 31, 1996

[54] POWER SAVING METHOD OF AN IMAGE FORMING APPARATUS

[75] Inventors: Don-Seon Lee, Kyungki-do; Seong-Woo Kim, Suwon, both of Rep. of Korea

[73] Assignee: SamSung Electronics Co., Ltd., Suwon, Rep. of Korea

[21] Appl. No.: 429,422

[22] Filed: Apr. 24, 1995

[30] Foreign Application Priority Data

Apr. 27, 1994 [KR] Rep. of Korea ............... 9016/1994

[51] Int. Cl.⁶ ............................................. G03G 15/20
[52] U.S. Cl. ............................ 399/28; 219/216; 399/20
[58] Field of Search ............................ 355/203, 207, 355/208, 285; 219/216; 432/59, 60; 347/156

[56] References Cited

U.S. PATENT DOCUMENTS

| | | | |
|---|---|---|---|
| 4,113,375 | 9/1978 | Murata et al. | 355/285 |
| 4,745,436 | 5/1988 | Matsuura | 355/206 |
| 4,980,836 | 12/1990 | Carter et al. | 364/483 |
| 5,081,493 | 1/1992 | Miyasaka | 355/208 |
| 5,151,573 | 9/1992 | Masuda | 219/216 |
| 5,163,124 | 11/1992 | Yabe et al. | 395/750 |
| 5,218,704 | 6/1993 | Watts, Jr. et al. | 395/750 |
| 5,280,328 | 1/1994 | Goto et al. | 355/285 |
| 5,317,367 | 5/1994 | Pierce et al. | 355/203 |
| 5,321,428 | 6/1994 | Dornier | 347/211 |

FOREIGN PATENT DOCUMENTS

| | | | |
|---|---|---|---|
| 56-38068 | 4/1981 | Japan | 355/285 |
| 6-262832 | 9/1994 | Japan | 355/285 |

*Primary Examiner*—Joan H. Pendegrass
*Attorney, Agent, or Firm*—Robert E. Bushnell, Esq.

[57] ABSTRACT

A power saving method of an image forming apparatus, such as a laser beam printer, warms up the image forming apparatus when a given time period has elapsed after entering a power saving mode for reducing energy consumption, thereby reducing the amount of time in waiting for a printing operation. The power saving method of the present invention includes the steps of: determining whether the image forming apparatus is in the power saving mode, performing a timing operation while the image forming apparatus is in the power saving mode and no print data is input, and warming up the image forming apparatus when a duration of the timing operation exceeds a predetermined time period.

24 Claims, 3 Drawing Sheets

POWER SAVING METHOD OF AN IMAGE FORMING APPARATUS

CROSS-REFERENCE TO RELATED APPLICATIONS

This application makes reference to, incorporates the same herein, and claims all benefits incurring under 35 U.S.C. §119 from an application for *Power Saving Method Of An Image Forming Apparatus* filed in the Korean Industrial Property Office on 27 April 1994 and there assigned Serial No. 9016/1994.

BACKGROUND OF THE INVENTION

The present invention relates to a power saving method of an image forming apparatus, such as a laser beam printer, and more particularly, to a power saving method of an image forming apparatus which automatically performs a warm-up operation when the image forming apparatus has been in a power saving mode for a predetermined time period, thereby reducing the waiting time for a printing operation.

Recently, an energy star computer program sponsored by the U.S. Environmental Protection Agency (EPA) allows manufacturers of energy efficient office equipment complying with specified contractual terms and conditions to use a designed energy star logo indicating the energy efficiency of their product. The energy star computer program is a cooperative effort between the U.S. Environmental Protection Agency and computer device manufactures to promote the production and sale of energy efficient office equipment. The program is particularly aimed at reducing air pollution resulting from the generation of power necessary to operate currently available office equipment. Accordingly, the program encourages the production of office equipment having power-saving features. Such equipment consumes less power, and thus helps reduce the production of air pollution. In an image forming apparatus, however, after power is turned on, the amount of time a user must wait before printing can be performed often exceeds the amount of time necessary for performing the actual printing. Prolonged stand-by times cause unnecessary power consumption attributable to operation of a heat lamp or a ventilating fan. In order to reduce unnecessary power consumption, after a given time period passes while in a stand-by state, a fan or fusing unit of the engine controller, for example, turns off to initiate a power saving mode. According to Environmental Protection Agency standards, this given time period is typically fifteen minutes. In order to perform a printing operation during the power saving mode, the fan and/or fusing unit of the engine controller must be adequately warmed up.

One prior art device equipped with a power saving mode is disclosed in U.S. Pat. No. 4,745,436 entitled Copying Machine issued to Matsuura on 17 May 1988. In an effort to enable rapid printing with minimal waiting, Matsuura '436 provides that a power saving mode can be cancelled automatically in response to any one of the operations relating to the start of the printing operation. Such operations include: placing a manuscript on the platen of the device, closing the device cover or pressing a copy start button. While such conventional art has merit in its own right, we believe that it can be improved.

Another conventional apparatus for reducing power consumption in peripheral devices of a computer is disclosed in U.S. Pat. No. 4,980,836 entitled *Apparatus For Reducing Computer System Power Comsumption* issued to Carter et al. on 25 December 1990. In Carter et al. '836, peripheral equipment, such as a printer, enters a low-power (stand-by) mode when it has not been accessed for a preset amount of time. A manual switch is provided in order to return the device to a normal power level, when so desired by the user. That is, this type of conventional art remains in the low-power mode until activated by the user. Accordingly, we believe that the conventional art can be improved to reduce the waiting time experienced by the user when the device is returning to its normal power level.

SUMMARY OF THE INVENTION

Accordingly, it is an object of the present invention to provide an improved power saving method for an image forming apparatus.

It is another object to provide a power saving method for an image forming apparatus that reduces the waiting time for a printing operation.

It is still another object to provide a power saving method for an image forming apparatus that automatically performs a warm-up operation when the apparatus is in a power saving mode.

It is yet another object to provide a power saving method for an image forming apparatus which provides a user with the capability of altering the time period in which the image forming apparatus remains in the power saving mode.

It is still yet another object to provide a power saving method for an image forming apparatus which provides the user with the capability preventing the image forming apparatus from entering the power saving mode.

These and other objects may be achieved with the present invention by a power saving method of an image forming apparatus, such as a laser beam printer, that warms up the image forming apparatus when a given time period has elapsed after entering a power saving mode, thereby reducing the amount of time in waiting for a printing operation. The power saving method of the present invention comprises the steps of: determining whether the image forming apparatus is in the power saving mode, performing a counting operation while the image forming apparatus is in the power saving mode and no print data is input, and warming up the image forming apparatus when a duration of the counting operation exceeds a predetermined time period.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENT

In the following description, several specific details are set forth to provide a more thorough understanding of the present invention. It will be apparent, however, to one skilled in the art, that the present invention may be practiced without these specific details. In other instances, well known circuits have not been described so as not to obscure the present invention.

Figure 1:
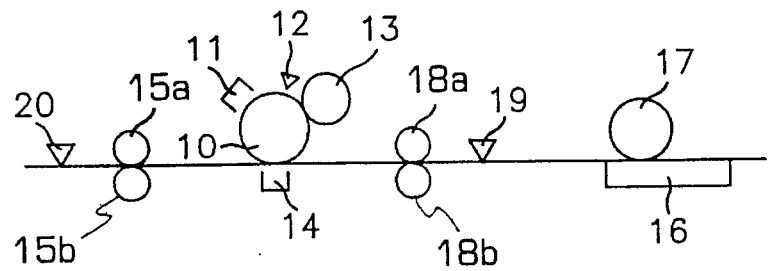
FIG. 1 is a schematic diagram showing an engine of an image forming apparatus.
Figure 2:
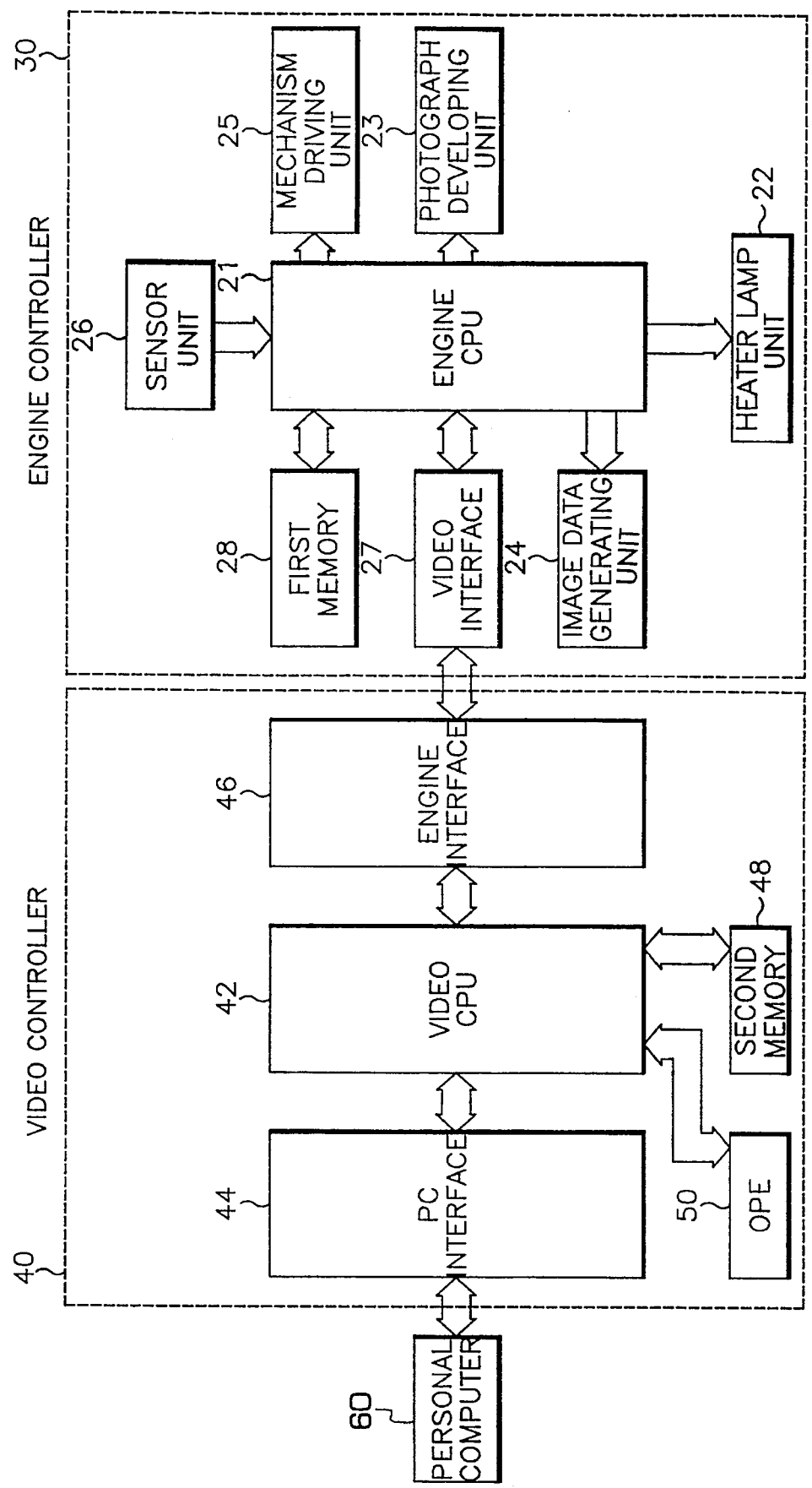
FIG. 2 is a block diagram showing a control circuit of the image forming apparatus.

FIGS. 1 and 2 show the general construction of an engine controller and control circuit of an image forming apparatus, such as a laser beam printer (LBP), which uses an electrophotographic developing system.

FIG. 1 is a schematic diagram showing an engine controller of an image forming apparatus. FIG. 1 is composed of a photosensitive drum 10, a charging unit 11 for forming a uniform charge on photosensitive drum 10, a light exposure unit 12 for forming an electrostatic latent image on photosensitive drum 10, a developing unit 13 for transmitting toner to the electrostatic latent image formed on photosensitive drum 10, a transfer unit 14 for transferring the toner formed on photosensitive drum 10 onto paper or another printable medium, a fusing unit having a heat roller 15a (including a heat lamp) and a press roller 15b for fusing toner onto the paper, a cassette 16 for storing the paper, a pick-up roller 17 for picking up and conveying paper stacked within cassette 16, register rollers 18a and 18b for receiving and arranging paper conveyed by pick-up roller 17, and first and second paper sensors 19 and 20, respectively, for sensing the conveyance state of the paper.

FIG. 2 is a block diagram showing the control circuit of the image forming apparatus. FIG. 2 is composed of an engine controller 30 and a video controller 40. An engine central processing unit (CPU) 21 controls operation of the engine in the image forming apparatus. A heater lamp unit 22 is controlled by engine central processing unit (CPU) 21, and thereby operates and controls fusing unit 15a and 15b. A photograph developing unit 23 controls electrophotographic development in accordance with the control of engine central processing unit (CPU) 21. An image data generating unit 24 is controlled by engine central processing unit (CPU) 21 and forms an electrostatic latent image on photosensitive drum 10. A mechanism driving unit 25 drives and controls operation of respective pans within the image forming apparatus in accordance with the control of engine central processing unit (CPU) 21. A sensor unit 26 inputs signals sensed from respective sensors to engine central processing unit (CPU) 21. A video interface 27 provides an interface for signals transmitted between video controller 40 and engine controller 30. A first memory 28 stores a print control program and temporarily stores printing data. A personal computer (PC) interface 44 provides an interface for signals transmitted between a personal computer 60 and video controller 40. A video central processing unit (CPU) 42 controls the flow of data transmitted from personal computer (PC) interface 44. An engine interface 46, connected to video interface 27, also provides an interface for signals transmitted between engine controller 30 and video controller 40. An operating panel (OPE) 50 comprised of a plurality of keys for generating key data, provides data to video central processing unit (CPU) 42 in response to key inputs. Operating panel 50 also includes a display device for displaying data transmitted from video central processing unit (CPU) 42. A second memory 48 stores programs to enable the warm up operation of the apparatus and other operations of video controller 40, and also temporarily stores data output from personal computer (PC) interface 44.

When the circuit of FIG. 2 begins operation, video central processing unit (CPU) 42 first initializes the system. At this time, heat roller 15a of the fusing unit of FIG. 1 increases to a temperature high enough to enable fixation of toner onto the paper (i.e. a stand-by temperature). When the temperature of the fusing unit reaches the stand-by temperature, engine central processing unit (CPU) 21 informs video controller 40 of this condition through video interface 27, and video controller 40 thereby initializes the system to a stand-by state (i.e. a print-ready condition).

As printing begins, photosensitive drum 10, charger 11, developing unit 13, transfer unit 14 and light exposure unit 12 operate in accordance with a predetermined timing sequence. After paper is fed from cassette 16, it passes through register rollers 18a and 18b after passing first paper sensor 19. As paper passes first paper sensor 19, a paper sensing signal is generated by first paper sensor 19 and transmitted to engine central processing unit (CPU) 21 through sensor part 26. Register rollers 18a and 18b receive and arrange the paper, and then transmit the paper to transfer unit 14. At this time, engine central processing unit (CPU) 21, which receives the paper sensing signal from first paper sensor 19, controls image data generating unit 24 to enable transfer of image data to light exposure unit 12. Engine central processing unit (CPU) 21 also controls photograph developing unit 23 in order to control operation of developing unit 13.

While paper is conveyed to transfer unit 14 by register rollers 18a and 18b, light exposure unit 12 transmits light corresponding to the image data output from image data generating unit 24 onto photosensitive drum 10, thereby forming an electrostatic image on a surface of photosensitive drum 10. At developing unit 13, toner is applied onto the electrostatic latent image of photosensitive drum 10 and the resulting image is then transferred onto the paper by transfer unit 14. The toner is then permanently affixed to the paper via heat roller 15a and press roller 15b of the fusing unit.

After completion of the above steps, the respective parts of image forming apparatus terminate operation sequentially, and paper containing the transferred image is ejected to the exterior of the apparatus. Once ejected, an engine driving motor for the apparatus stops operation.

A conventional printing method for performing a warm-up operation is described in Patent application Serial No. 9170 filed in the Korean Industrial Property Office in 1993 by the same assignee as the present invention. In this method, when a print command is input from personal computer (PC) 60 or operating panel (OPE) 50, video central processing unit (CPU) 42 generates a warm-up signal according to a program stored in second memory 48, and applies the signal to engine controller 30 through engine interface 46. In engine controller 30, the warm-up signal is input to engine central processing unit (CPU) 21 through video interface 27. In response, engine central processing unit (CPU) 21 controls heat lamp unit 22 and mechanism driving unit 25 to thereby warm-up fusing unit 15a and 15b and a fan. After the warm-up operation is performed, engine central processing unit (CPU) 21 activates the stand-by state and informs video central processing unit (CPU) 42 that the warm-up operation has been completed. Video central processing unit (CPU) 42 then enables transmission of the print data to engine controller 30 when the print data is input from personal computer (PC) interface 44. At this time, engine controller 30 receives the print data and performs the printing operation.

In the conventional printing method described above, when the print command from the personal computer is entered during the power saving mode of the printing apparatus, the warm-up operation is first performed, and printing is then commenced. Therefore, since the user must wait while the warm-up operation is performed, the actual printing operation is delayed and the user experiences an inconvenient waiting period.

Figure 3:
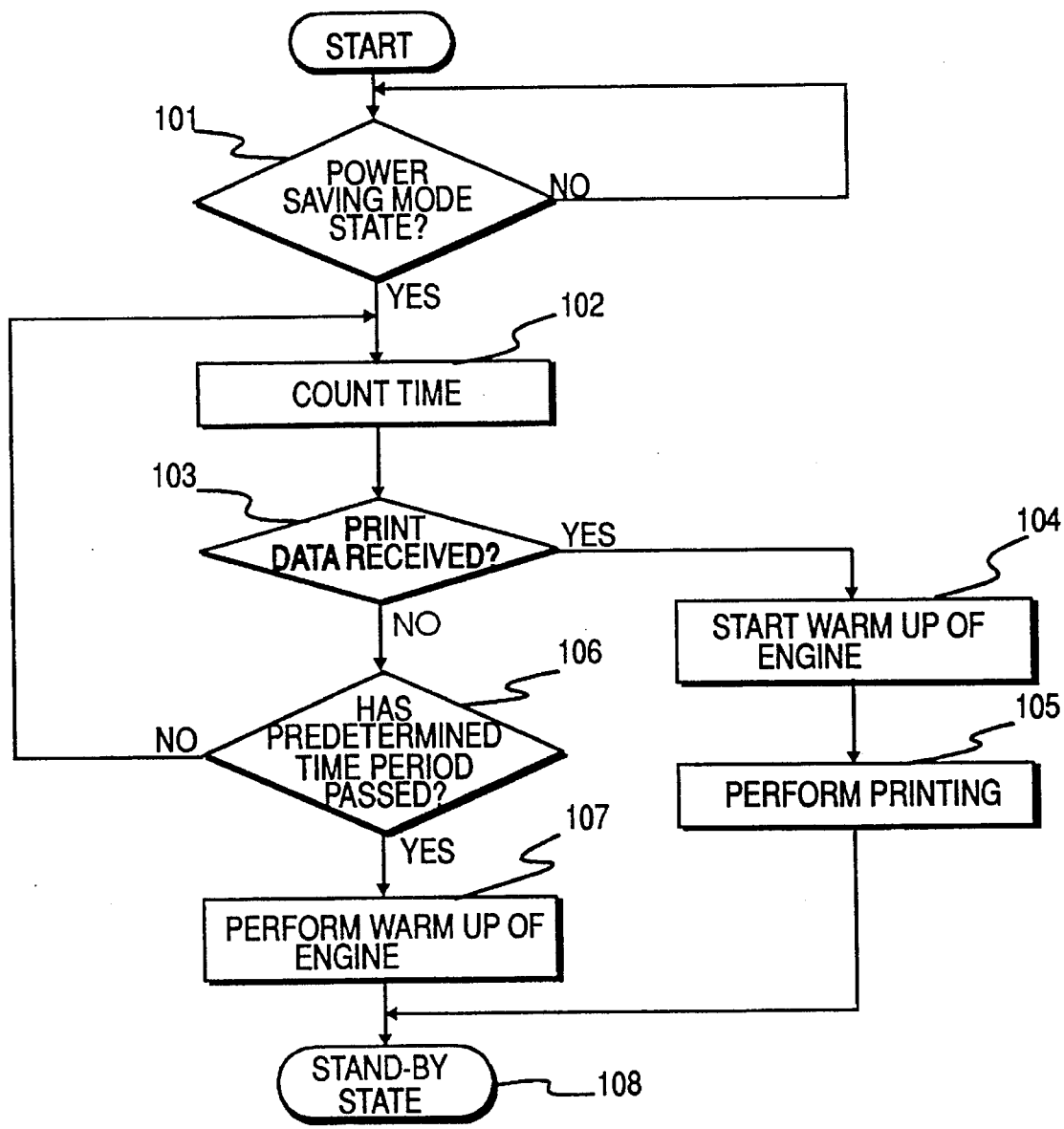
FIG. 3 is a flow chart showing a power saving method of an image forming apparatus according to the principles of the present invention.

FIG. 3 is a flow chart showing a power saving method of an image forming apparatus according to the principles of the present invention. FIG. 3 comprises the steps of: determining whether the image forming apparatus is in the power saving mode, performing a timing operation while the image forming apparatus is in the power saving mode and no print data is input, and warming up the image forming apparatus when a duration of the timing operation exceeds a predetermined time period.

Referring now to FIGS. 1 through 3, a preferred embodiment of the present invention will be described. In step 101, video central processing unit (CPU) 42 determines whether or not the image forming apparatus is in the power saving mode. If the image forming apparatus is in the power saving mode, video central processing unit (CPU) 42 proceeds to step 102 where an internal counter begins a timing operation. In step 103, video central processing unit (CPU) 42 determines whether or not print data is received. If print data is received in step 103, video central processing unit (CPU) 42 proceeds to step 104, generates a warm-up signal and transmits the warm-up signal to engine controller 30 through engine interface 46, thereby starting the warm-up operation. During this time, engine central processing unit (CPU) 21 outputs a lamp enabling signal to heater lamp unit 22. Heater lamp unit 22 receives the lamp enabling signal and begins heating the heat lamp within heat roller 15a of the fusing unit to a printing temperature. That is, fusing unit 15a and 15b of FIG. 1 increases its internal temperature to a temperature capable of affixing toner onto the paper.

Next, in step 105, the printing operation is performed. Video central processing unit (CPU) 42 transmits printing data received from personal computer 60 through personal computer (PC) interface 44 to engine controller 30. Engine central processing unit (CPU) 21 determines whether the temperature of fusing unit 15a and 15b is at a level necessary to enable performance of the printing operation. If the requisite printing temperature is achieved, engine central processing unit (CPU) 21 controls mechanism driving pan 25 and thereby initiates operation of an engine driving motor. Engine central processing unit (CPU) 21 then controls respective parts of the image forming apparatus such as photosensitive drum 10, charging unit 11, developing unit 13, transfer unit 14 and light exposure unit 12 so that the respective parts operate according to a predetermined timing sequence. Paper is then fed from cassette 16 of FIG. 1. When the paper arrives at register rollers 18a and 18b after passing first paper sensor 19, a paper sensing signal from first paper sensor 19 is input to engine central processing unit (CPU) 21 through sensor unit 26. Register rollers 18a and 18b arrange the paper and feed the arranged paper to transfer unit 14. Engine central processing unit (CPU) 21 receives the paper sensing signal, controls image data generating unit 24, and thereby outputs image data to light exposure unit 12. Engine central processing unit (CPU) 21 also controls photographic developing unit 23 in order to control developing unit 13.

While paper is being transmitted to transfer unit 14 via register rollers 18a and 18b, light exposure unit 12 transmits light corresponding to the image data output from image data generating unit 24 onto photosensitive drum 10, thereby forming an electrostatic image on a surface of photosensitive drum 10. Toner from developing unit 13 is then transferred onto the light exposed portion of photosensitive drum 10 and developed. The toner developed on photosensitive drum 10 is transferred via transfer unit 14 to the paper transmitted from register rollers 18a and 18b. The toner on the paper is then fused onto the paper by the heat and pressure of heat roller 15a and press roller 15b of the fusing unit. When the operations described above are complete, respective parts of the image forming apparatus terminate sequentially, and the paper containing the transferred image is ejected to the exterior of the apparatus. In step 108, a printing stand-by state is activated, and the image forming apparatus waits for the power saving mode to again be established.

If the prim data is not received in step 103, however, step 106 is performed. In step 106, video central processing unit (CPU) 42 determines whether or not the duration of the timing operation exceeds a predetermined time period input from operating panel (OPE) 50 or stored in memory. That is, video central processing unit (CPU) 42 determines whether the image forming apparatus has been in the power saving mode for the predetermined time period without receiving any print data. If not, video central processing unit (CPU) 42 returns to step 102. If, however, the image forming apparatus has been in the power saving mode for the predetermined time period without receiving any print data, the warm-up signal is generated and transmitted to engine controller 30 through engine interface 46 in step 107. That is, engine central processing unit (CPU) 21 of engine controller 30 transmits the lamp enabling signal to heater lamp unit 22. Heater lamp unit 22 receives the lamp enabling signal and responds by heating the heat lamp of fusing unit 15a and 15b to the stand-by temperature, thereby performing the warm-up operation. After the warm-up is perfomed, the printing stand-by state is established in step 108 and the image forming apparatus awaits activation of the next power saving mode. It is also preferable that a user be provided with the ability to alter the predetermined time period of FIG. 3. A flow chart showing a method for changing the predetermined time period according to the principles of the present invention is shown in FIG. 4.

Figure 4:
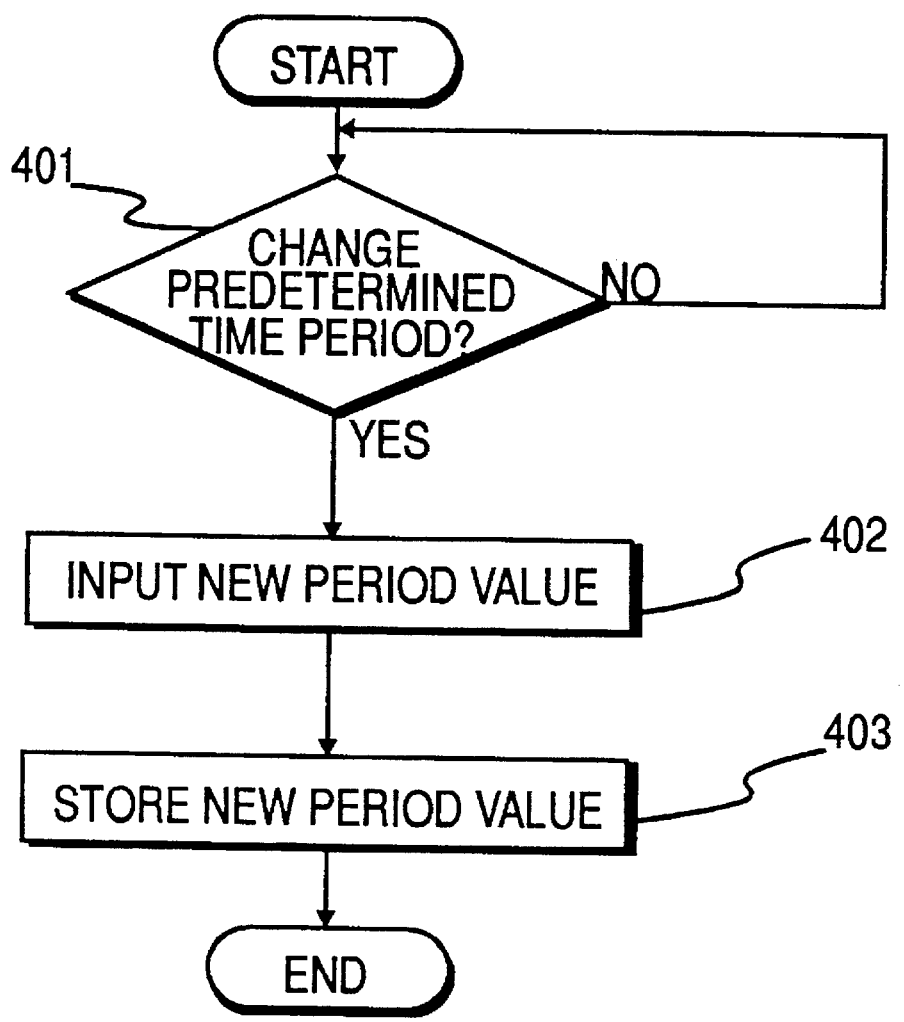
FIG. 4 is a flow chart showing a method for changing the predetermined time period according to the principles of the present invention.

In step 401 of FIG. 4, video central processing unit (CPU) 42 determines whether a key for changing the duration of the predetermined time period is input from operating panel (OPE) 50 or through personal computer (PC) interface 44. If the changing key is input, video central processing unit (CPU) 42 provides a value representative of a new duration of the predetermined time period in step 402, and then stores the value in step 403 (the time period can be expressed in seconds, minutes or hours). This new time period is then used in the operations of FIG. 3. For example, if the duration of the predetermined time period is changed to indicate a value of "0", as soon as the image forming apparatus is to enter the power saving mode, the warm-up operation is performed. That is, the image forming apparatus continuously maintains the stand-by state without entering the power saving mode.

In FIGS. 3 and 4, assume for purposes of example that the predetermined time period is one hour and the time for activating the power saving mode from the stand-by state is fifteen minutes. Under these conditions, if the image forming apparatus is in the stand-by state for fifteen minutes without receiving any print data, the power saving mode is activated. After the image forming apparatus is in power saving mode for one hour, the warm-up operation is performed and the stand-by state is again established. This procedure can be repeated in accordance with the designated time periods.

As stated above, when the image forming apparatus maintains the stand-by state for a given period, the power saving mode is activated. In the power saving mode, the apparatus is periodically warmed up in accordance with the predetermined time period and a printing operation can then be performed. Accordingly, the present invention advantageously provides a reduced printing time. There may be some users of the present invention who want to minimize the duration of the power saving mode, or who want to eliminate its occurrence altogether. For these users, the present invention provides the benefit of enabling the user to manipulate the duration of the power saving mode. Furthermore, while the power saving mode of the present invention has been described only in the context of controlling operation of the heat lamp of the fusing unit, it will be intuitive to those skilled in the art that the same concept may be applied to controlling operation of a fan or other components.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A power saving method of an image forming apparatus, comprising the steps of:

determining whether said image forming apparatus is in a power saving mode;

performing a timing operation while said image forming apparatus is in said power saving mode and no print data is input; and warming up said image forming apparatus to a stand-by state where said image forming apparatus is capable of performing a printing operation when a duration of said timing operation exceeds a predetermined time period.

2. The power saving method as claimed in claim 1, further comprising the steps of:

determining whether a time period change key indicating a change in said predetermined time period is input by a user;

entering a changed time period when said time period change key is input; and storing said changed time period as said predetermined time period.

3. The power saving method as claimed in claim 2, further comprising a step of continuously maintaining said stand-by state of said image forming apparatus when said predetermined time period is represented as a specific value.

4. The power saving method as claimed in claim 3, wherein said specific value is "0".

5. The power saving method as claimed in claim 2, further comprising a step of warming up said image forming apparatus to said stand-by state when the print data is input within said predetermined time period after said image forming apparatus enters said power saving mode.

6. The power saving method as claimed in claim 5, wherein said image forming apparatus continuously maintains said stand-by state when said predetermined time period is represented as a specific value.

7. The power saving method as claimed in claim 6, wherein said specific value is "0".

8. The power saving method as claimed in claim 1, further comprising a step of warming up said image forming apparatus to said stand-by state and performing said printing operation when said print data is input within said predetermined time period after said image forming apparatus enters said power saving mode.

9. The power saving method as claimed in claim 1, wherein said step of warming up said image forming apparatus to said stand-by state comprises a step of increasing a temperature of a fusing unit of said image forming apparatus to a level necessary to perform said printing operation.

10. A power saving method of an image forming apparatus, comprising the steps of:

performing a timing operation while said image forming apparatus is in a power saving mode;

determining whether print data is received by said image forming apparatus during said timing operation; and warming up said image forming apparatus to a stand-by state where said image forming apparatus is capable of performing a printing operation when said print data is not received during said timing operation and a duration of said timing operation exceeds a predetermined time period.

11. The power saving method as claimed in claim 10, further comprising a step of warming up said image forming apparatus to said stand-by state and performing said printing operation when said print data is received by said image forming apparatus before the duration of said timing operation exceeds said predetermined time period.

12. The power saving method as claimed in claim 11, further comprising the steps of:

determining whether a time period change key indicating a change in said predetermined time period is input by a user;

entering a changed time period when said time period change key is input; and storing said changed time period as said predetermined time period.

13. The power saving method as claimed in claim 12, further comprising a step said image forming apparatus continuously maintaining said stand-by state when said predetermined time period is represented as a specific value.

14. The power saving method as claimed in claim 13, wherein said specific value is "0".

15. The power saving method as claimed in claim 10, wherein said step of warming up said image forming apparatus to said stand-by state comprises a step of increasing a temperature of a fusing unit of said image forming apparatus to a level necessary to perform said printing operation.

16. A power saving method of an image forming apparatus, comprising the steps of:

beginning a timing operation in response to said image forming apparatus entering a power saving mode;

determining whether print data indicative of commencement of a printing operation is received while said image forming apparatus is in said power saving mode;

determining whether a duration of said timing operation exceeds a predetermined time period; and warming up said image forming apparatus to a stand-by state where said image forming apparatus is capable of performing said printing operation when one of said print data is received while said image forming apparatus is in said power saving mode and said duration of said tinting operation exceeds a predetermined time period.

17. The power saving method of claim 16, further comprising the steps of:

providing a user input representative of a new time period; and replacing said predetermined time period with said new time period.

18. The power saving method of claim 16, further comprised of said image forming apparatus continuously maintaining said stand-by state when said predetermined time period is represented as a specific value.

19. The power saving method of claim 18, wherein said specific value is "0".

20. The power saving method of claim 16, wherein said step of warming up said image forming apparatus to said stand-by state comprises a step of increasing a temperature of a fusing unit of said image forming apparatus to a level necessary to perform said printing operation.

21. An image forming apparatus, comprising:

first control means for monitoring a first time interval during which said image forming apparatus is in a power saving mode, and determining whether print data indicative of commencement of a printing operation is received while said image forming apparatus is in said power saving mode, said first control means generating and providing output of a warm-up signal when one of said first time interval exceeds a predetermined time interval and said print data is received while said image forming apparatus is in said power saving mode; and second control means for warming up said image forming apparatus to a stand-by state where said image forming apparatus is capable of performing said printing operation in response to receipt of said warm-up signal from said first control means.

22. The image forming apparatus as claimed in claim 21, further comprising fusing means for enabling fixation of a toner image upon a printable medium during said printing operation as the printable medium passes through said image forming apparatus, said fusing means being increased in temperature to enable performance of said printing operation in response to receipt of said warm-up signal from said first control means.

23. The image forming apparatus as claimed in claim 21, further comprising key input means for enabling user input of data representative of said predetermined time interval.

24. The image forming apparatus as claimed in claim 22, further comprising key input means for enabling user input of data representative of said predetermined time interval.

* * * * *